Patented Oct. 11, 1938

2,132,417

UNITED STATES PATENT OFFICE 2,132,417

CAKE

Benjamin R. Harris, Chicago, Ill., assignor to The Procter & Gamble Company, Cincinnati, Ohio, a corporation of Ohio No Drawing. Application November 14, 1934, Serial No. 752,941

4 Claims. (Cl. 99—92)

My invention relates to a process for making an improved cake batter, and a new shortening composition adapted for use particularly in baked flour compositions such as cakes. My present invention is a continuation in part of my prior application Serial No. 700,827, filed December 4, 1933.

The principal object of my invention is the provision of a process for making an improved cake batter.

Another object is the provision of an improved shortening material having advantages as a constituent of cakes and the like.

Another object is the provision of an improved shortening.

Another object is the provision of an improved cake batter.

Another object is the provision of an improved baked flour product.

Other objects and features of the invention will be apparent as the description progresses.

The usual method of making cake with whole eggs includes the use of a certain amount of liquid (such as milk and liquid of the whole eggs) in proportion to the amount of flour. Ordinarily, if a greater amount of liquid is added, the amount of yolk material must be increased or the texture and structure of the cake will suffer. I have discovered that if a fatty acid ester of a polyglycerol, the ester containing free hydroxyl groups, is added to a cake batter emulsion, a relatively larger proportion of moisture in the form of milk or whole eggs, or the like, may be used without any addition of yolk material. The amount of sugar can also be increased without disturbing the cake structure and the batter emulsion is improved in consistency and smoothness. The final baked product has an improved grain and texture and keeps longer. These advantages accruing from the use of my polyglycerol esters become especially important when the amounts of sugar and of liquids exceed the amount of flour in the batter.

The polyglyceride with free OH groups may be incorporated directly in the shortening used, in which case the shortening as a new composition may be furnished to the baker. In practice, I may use a polyglyceride made from mixed fatty acids of lard or mixed fatty acids of fully or partially hydrogenated oils, or the esters of the higher fatty acids of palm kernel or coconut oil, with sufficient keeping qualities, or, in fact, the polyglycerides of the fatty acids of any edible oil or fat having preferably more than two free hydroxyl groups. The polyglycerides may be used to the extent of about 2 or 3% by weight of the shortening, although the proportions may be varied. From 1 to 5 or 6% may be used with good results.

An example of the use of my product is as follows: 10 lbs. of flour are creamed together with shortening containing 3 to 4% of the material containing the fatty acid polyglycerides with free hydroxy groups, as prepared by methods shown later. 13¾ lbs. of sugar, ¼ lb. of salt and 9 oz. baking powder are all mixed together homogeneously and 3 lbs. of milk added. This latter mixture is added to the creamed flour and shortening and thoroughly mixed. A previously prepared mixture of 6½ lbs. of whole eggs and 7½ lbs. of milk with flavoring is then added with continued mixing until a smooth creamy batter is produced. The product is baked in the ordinary way. The resulting cake has excellent grain and texture, enhanced "moistness" and superior volume and resistance to staling.

I shall now describe the improved materials of my invention from the standpoint of improvement in shortening materials.

My improved shortening material is generally somewhat plastic at ordinary room temperatures, and has the property of imbibing somewhat larger proportions of moisture than the unmodified shortening; but the production of improved qualities in baked flour products and in batter emulsions containing increased sugar and liquids is the result, primarily, of a mechanism other than mere absorption of moisture by the shortening, as set out in greater detail hereinbelow.

Generally speaking, my improved shortening or oleaginous material comprises an oleaginous substance of a proper character to be used as a shortening, through which is dispersed a proportion of a polyglyceride substance with free hydroxy groups, of the general character disclosed in my co-pending application, Serial No. 697,533, filed November 10, 1933. The addition agents which I use in the shortening may also contain, beside the polyglycerides, mono- and di-glycerrides. The presence of polyglycerides makes possible a better dispersion of the diglycerides into the cake batter emulsion, thus increasing the effectiveness of the diglycerides in improving the cake. The shortening so prepared is productive of improved results for substantially all purposes for which shortening is used. Some of these uses and advantages will be pointed out more fully hereinafter.

The oleaginous substance used which comprises the main constituent of my shortening may be of any of the usual materials employed for shortening purposes such as either animal or vegetable fats or oils. I prefer, however, to employ an oleaginous material of vegetable origin having a melting point of between approximately 95 and 105° F. A very suitable substance is a partially hydrogenated vegetable oil such as hydrogenated cotton seed oil, peanut oil, or the like, the hydrogenation being carried on until the material will have an iodine number of approximately 60 to 75 with the melting point within the range indicated. This produces a material which is sufficiently plastic at ordinary temperatures to be used in the way that shortening is usually employed. I may, of course, also use blends of various fats and oils to produce a material having suitable physical characteristics for shortening purposes.

The polyglyceride substance referred to in my copending application above referred to is preferably produced in accordance with the directions disclosed in my copending application. My preferred process is first to polymerize a substantially water free glycerine to produce suitable polyglycerols and then to mix the polyglycerols with a fatty substance having a fatty acid radical. Heating of the mixture under proper conditions will result in esterification in case fatty acids are used, or re-esterification in case a triglyceride fat is used and produce a final polyglyceride having at least two free hydroxy groups in the molecule. In general, the fatty material which I employ in the last step of the process is preferably solid at ordinary room temperature, but I may employ liquid oils for the purpose, as will be shown.

The product produced by the re-esterification of a triglyceride with a polyglycerol contains a major proportion of polyglycerides with free OH groups and a smaller amount of mono- and diglycerides. While in this mixture the polyglycerides perform the principal role, the mono- and/or diglycerides also have an effect in improving the cake batter and final baked cake. It should be noted, however, that while both the polyglycerides and mono- and diglycerides are hydrophillic and will function when used in proper amounts to improve a cake batter emulsion, these materials nevertheless have entirely different properties and function differently in the cake batter emulsion. Not only do the polyglycerides function differently than the mono- and diglycerides, but a mixture containing polyglycerides with a proportion of mono- and diglycerides will function differently than mono- and diglycerides employed alone.

Practically all of the polyglycerol esters present in my polyglyceride compositions contain more free OH groups than either mono- or diglycerides, which changes their properties and functions, but in all cases they also contain linkages such as —$H_2C$—O—$CH_2$— which give the compounds specific properties from the standpoint of interface modification and as emulsification and dispersion agents. These linkages are not present in either mono-, di- or tri-glycerides. Thus, for example, even fat, substantially completely re-esterified with glycerine, which produces a mixture of mono- and di-glycerides, when added at the rate of say 6% to a dry shortening, will increase the water absorption capacity of that shortening to a great extent favoring a water-in-oil emulsion on account of the lipophillic properties of the diglycerides. Such products, when added to the margarine in quantities of 1% to 2%, or even more, will not be anti-spatterers in that they will not prevent the spattering during frying of margarine made from fats and oils and cultured milk, due to the fact that the lipophillic properties of the added compounds are too pronounced.

On the other hand, my polyglyceride compositions as prepared above, which include polyglycerol esters, contain a proportion of hydroxy groups sufficient to make the product more hydrophillic. They function as anti-spatterers when added to margarine in proportions of 1% to 2% or less. When these reaction products are added to the extent of even 5% to 6% to a dry shortening, and water is emulsified therein, they increase the water absorption of the shortening somewhat, but not to the same extent as the diglycerides or the mixture of mono- and diglycerides, in view of the fact that the polyglyceride addition agent tends to produce emulsions of the reverse type. However, when used in a cake batter having a substantially greater liquid content in the form of milk or the like than flour, the mono- and diglycerides, although they possess water absorption capacity, are not effective in dispersing the sugar and liquids and the various ingredients, and do not produce from such a cake batter a good cake which retains its shape and volume, unless very large proportions of the mono- and/or diglycerides are used. In the case of the diglyceride, as much as 20 to 22% is required to function in the same manner as 3% of my reaction mixture containing the polyglycerol esters, although the latter manifests less water absorption capacity when the water is added to the shortening itself and emulsified with it.

There is, therefore, a great difference between the mechanism of and results obtained with the mono- and/or diglycerides in the cake batter, and the polyglycerides in the reaction mixture as prepared in examples numbered 1, 2, 3 and 4. A relatively much smaller proportion of the polyglycerides affect the various constituents of the cake batter in such a manner so as to produce a smoother batter and produce a cake of good shape, volume, grain, and texture when larger proportions of liquids and sugar are used, as shown by examples, even if as high as 175% of liquids based upon the flour are used. The polyglycerides with the free hydroxy groups have entirely different properties than the mono- and diglycerides with reference to water absorption capacity in a fat and water mixture, and function, therefore, in an entirely different manner in the cake batter.

In the reaction mixture containing polyglycerides and glycerides with free OH groups, the polyglycerides with the free hydroxy groups aid in the dispersion of the ingredients of the formula and increase their potency.

In the preparation of the polyglycerols, I take for example one hundred pounds of glycerine containing no water or as little water as possible, and heat the same with one pound of a catalyst such as sodium hydroxide. The temperature is brought up to about 260° C. and heating continued for approximately four and one-half hours, preferably in a non-oxidizing atmosphere, moisture formed during the reaction being permitted to escape. This may be produced by bubbling carbon dioxide or some other inert gas through the glycerine, or having an inert atmosphere such as $H_2$ or $CO_2$ above surface of glycerine, or by refluxing in vacuum.

During the prolonged heating, whatever water is originally contained in the glycerine as well as the water formed as a reaction product boils off with some slight amount of glycerine as well. The resulting product consists principally of a mixture of polyglycerols. It should be noted that the higher the temperature employed, the longer the heating period, and the stronger the alkali, the greater will be the degree of polymerization. For my purpose, the degree of polymerization obtained under the conditions given is very satisfactory.

In place of sodium hydroxide as a catalyst, I may employ other materials such as potassium hydroxide, magnesium oxide, sodium carbonate, sodium acetate, and other like materials having an alkaline or potentially alkaline reaction, or iodine or other glycerine polymerizing catalysts. In each case, some modifications in either time of treatment, temperature, or amount of catalyst is necessary if the results are to be the same as in the example given above. It is understood, however, that a considerable range is permitted in degree of polymerization of the glycerine, and satisfactory results in the final product will still be obtained.

I can prepare my polyglycerol in a manner so it will contain a relatively small proportion of glycerine, and I can prepare it in a manner so that it will be substantially free of glycerine. For example, I add 1% of sodium hydroxide to substantially moisture free glycerine and heat the same for about 4½ hours at approximately 260° C. and under atmospheric pressure. The product is stirred constantly and protected from atmospheric air by bubbling carbon dioxide therethrough. Whatever free glycerine remains may be removed by lowering the temperature to 175 to 180° C. and reducing the pressure to about 7 mm., carbon dioxide being bubbled through the mixture in the meantime. When no more glycerine boils off, the product is allowed to cool. The resultant product, largely a mixture of di- and higher polymers, is a very thick syrupy product of a slight amber color.

Another method is to heat the glycerine to which about one percent of sodium hydroxide has been added under a partial vacuum using a reflux condenser, while bubbling an inert gas through the reaction mixture, the temperature being raised gradually as the reaction progresses. As an example, the glycerine is heated gradually, using CO$_2$ from the beginning for stirring and to avoid contact with oxygen. The temperature is gradually raised, and pressure gradually reduced, until a temperature of between 225° C. and 230° C. and a pressure of 160 to 165 mm. are reached. The temperature of the reflux condenser at this time should be sufficiently hot to facilitate distillation of water vapor, between 90 and 100° C. is usually sufficient. These conditions of temperature and pressure are maintained for a total of about seven hours. The resulting polymerized product may be used at once after cooling, or it may be treated further to remove any unpolymerized glycerine which may remain. If the temperature of polymerization is raised to 250 to 260° C., and a pressure of 440 mm., which is gradually reduced during the progression of the reaction to about 120 mm., is maintained, the time of reaction is cut down to two to two and one-half hours and the resultant product is a viscous syrup of pale straw color, practically free of objectionable odor, and a mean molecular weight of about 166 to 220. To remove any free glycerine present, the temperature is lowered to about 175 to 180° C. and the pressure reduced to 10 or 15 mm. or below. Under these conditions, the glycerine will distil off. It is understood that any pressure may be used which will permit the glycerine to distil off.

In preparing my fatty acid esters of the polyglycerides, I may choose a polyglycerol product which contains some glycerine and esterify the same with high molecular weight fatty acids, thus producing a product containing a substantial amount of polyglycerides with free hydroxy groups and a smaller amount of mono- and/or diglycerides. On the other hand, I can also take a polyglycerol product which is substantially free of glycerine and re-esterify it with a fat or oil in such a manner as to obtain a product which contains also a larger proportion of the polyglycerides with free hydroxy groups and a smaller proportion of the mono- and di-glycerides.

*Example 1*

300 pounds of corn oil are heated with 300 pounds of polyglycerol prepared as above, at approximately 265° C. in the presence of three-tenths of a pound of caustic soda. The mixture is heated for about three hours at from 260 to 265° C. in the absence of air, preferably using an inert gas in a way also to cause the stirring, such as carbon dioxide or nitrogen. After the reaction is completed, the material is allowed to cool and any excess of polyglycerol is drawn off. This product contains a preponderance of polyglycerol esters with free OH groups, and it possesses the property to reduce the spattering of margarine containing fats and cultured milk when subjected to frying.

*Example 2*

540 pounds of prime leaf lard is mixed with 640 pounds of polyglycerols prepared as described, and 54/100 pounds of caustic soda added thereto. The mixture is heated to approximately 260° C. and maintained at this temperature for approximately three hours. A non-oxidizing atmosphere is maintained and the material is stirred constantly during heating. After cooling, the excess of polyglycerol is drawn off. The resulting product is a lard-like fatty composition which, however, is readily dispersable in water and/or other aqueous medium.

The above reaction products of Examples 1 and 2, when introduced to the extent of 1% to 2% in margarine comprising oleaginous material and cultured milk, will substantially reduce the spattering during frying.

*Example 3*

In place of carrying out the step of polymerizing the glycerine completely before employing the second step of the process, I may continue to carry on a part of the polymerizing step in conjunction with esterification as it occurs in the second step of the process. As an example, I take 3¼ parts of sodium hydroxide (flaked) and dissolve the same in 325 parts of glycerine (95%). The solution is heated in a non-oxidizing atmosphere to 260° C. This requires some time because of the water originally present which has to boil off, and also because of the water of reaction which must also be expelled. After the temperature is reached, I continue to heat with constant stirring for about two and one-half hours. This product will contain a mixture of polyglycerols and glycerine. At this time, 400 pounds of melted oleostearine and ⁴⁄₁₀ part of caustic soda are added. Heating is continued in an inert atmosphere at a temperature between 240 and 250° C. The mixture becomes homogeneous approximately in this temperature range. This temperature is maintained for about one and one-half hours or more, and the mass is then cooled while maintaining a non-oxidizing atmosphere. This product comprises a mixture of polyglycerol esters containing free OH groups, including mono- and/or diglycerides, the former being in excess, although not as much as in Examples 1 and 2. The product possesses valuable colloidal properties, although it differs somewhat from the product of previous examples.

*Example 4*

I take a highly polymerized polyglycerol which still contains small proportions of glycerine, 300 parts, and add to it 280 parts of best distilled oleic acid and 280 parts of stearic acid of good color and odor, and bring the mixture to a temperature of 220°, and heat it between 220 and 225° C. for from one and three quarters to two and one-quarter hours, at atmospheric pressure while bubbling carbon dioxide through. This product, when cooled, is plastic and of a light color. It can be further purified by passing steam, preferably superheated steam, through it for about thirty minutes or more, while the mixture is at 240° C. The product is then cooled while bubbling carbon dioxide through, or while keeping an atmosphere of carbon dioxide above the surface. Such product will be practically odorless and will contain a large preponderance of polyglycerides with a small amount of mono- and diglycerides. The amount of glycerides present depend upon the amount of glycerine in the polyglycerol.

In place of the fatty acids used in this example, I can also use the deodorized fatty acids of partially hydrogenated cotton seed oil which has been hydrogenated to a melting point of 100 to 110° C., or to an iodine number of about 45 to 60, and proceed in the same manner as in Example 4, or other examples given. I may also use the fatty acids of oleostearine or any other commercial fatty acids of an edible nature which have been properly treated so they will not leave any offensive odor or taste in the finished product. I can also prepare a polyglycerol mixture by heating glycerine with 1% of sodium hydroxide at a temperature of 220 to 225° C., for eleven hours at 127 to 70 mm. pressure under reflux, bubbling carbon dioxide through, dropping the pressure as the reaction proceeds. A pale amber colored product will be produced, viscous and syrupy in character, which has a mean molecular weight corresponding to a triglycerol.

I take 40 parts of this product and heat it with 90 parts of oleostearine, bring the temperature to 250° and keep it there for two hours at atmospheric pressure while bubbling carbon dioxide through. The resultant product will contain a preponderance of polyglycerides and some mono- and diglycerides.

I have given several examples of the manner of producing my new composition, all employing polyglycerol mixtures which may or may not contain a small amount of glycerine, and all employing fatty acids derived from a natural oil or fat of commerce, whether hydrogenated completely, partially hydrogenated, or unhydrogenated. In some cases, the oil or fat is re-esterified with the polyglycerols and in other cases the fatty acids derived from the oil or fat are esterified with polyglycerols to produce polyglycerides with free hydroxy groups. In general, the polyglycerides produced are either mono- or di- fatty acid esters. They preferably have more than two hydroxy groups in the molecule, although if they have at least two hydroxy groups, they may be used with very good results. The materials employed in the present invention, therefore, besides the polymerized glycerine, are substantially any oil, fat, wax, or fatty acid of an innocuous nature, whether occurring naturally or synthetically produced.

I have already described the use of polyglycerides in producing a cake batter, and described that one manner of introducing the polyglyceride is by incorporating the same in a shortening. All this has been described in detail. It is by no means necessary, however, that the polyglycerides be incorporated in the shortening, as they may be mixed with substantially any of the ingredients going into the preparation of the cake batter. A very suitable method is to incorporate the polyglycerides in any of the aqueous materials such as eggs, milk, or the like. When processed eggs are used, such as frozen eggs, the polyglycerides are suitably incorporated in the egg material.

The reaction product made according to Example 4, or other examples, may be incorporated with equal weights in dry shortening and dispensed in this manner to the baker. A given amount of the fatty material containing the reaction mixture is added to the cake batter, the amount varying from ½ oz. or less to 2 oz. or more for each pound of shortening used in the formula, depending upon the dilution of active ingredients in shortening, depending upon the type of cake and the amount of egg material or yolk material or absence of yolk material, and depending upon the additional liquids and sugar used in the formula. When the total amount of liquids is increased in large proportions above that of the flour, or the amount of yolk diminished or eliminated entirely, a large proportion of the addition agent is used in order to produce a cake with improved texture, with an increased proportion of liquids and sugar. Thus the baker does not need to waste the addition agent using excess when not required for a specific formula, or by not using sufficient. The dispensing of the addition agent with a shortening in 50% proportion, or by itself, to be added to the cake batter, offers a great advantage to the baker and gives him considerable latitude in the use of this improving agent whenever necessary and in the proportion necessary for the specific formula desired. If the addition agent is incorporated in the larger amount of shortening, then the baker cannot have a similar latitude as when he desires to use a larger proportion of the addition agent he must simultaneously also use a much larger proportion of the shortening than that required. On the other hand, if his formula is such that he wants to diminish the amount of addition agent, he must correspondingly reduce the total amount of shortening in the product.

The composition of matter as described above, containing a larger excess of polyglycerides in combination with smaller proportions of mono- or diglycerides, may also be mixed with sugar or flour, and a concentrated mixture is made and sold in this manner to the baker. Any desired proportion of the reaction mixture may be incorporated.

I referred specifically hereinabove to one method of compounding the ingredients to produce the cake batter. I am not limited to the use of this method, as I find that with the use of my material, substantially any order of mixing customarily used can be employed without difficulty. By polyglycerides, I mean higher fatty acid esters of polyglycerols, said esters containing more than one unesterified free OH group. Some of the examples given have more than two free OH groups.

The cake batter formula given in a previous example employs whole eggs as a constituent and the batter, when baked, produced a conventional type of cake ordinarily made by a formula which includes shortening and whole eggs. I am by no means limited in the character of cake produced, nor in the use of any particular egg material or other ingredients. As an example, I can prepare a so-called white cake which does not use any yolk material at all, but only egg whites, and I can secure the same kind of advantages and improvements which are obtained when employing the formula heretofore given. In other words, when the materials of my invention are employed in a white cake formula, a larger proportion of liquids than flour can be used and also a larger proportion of sugar. I give below a formula for a white cake, indicating at the right the order in which the ingredients are added and the preferred manner of mixing:

| Ingredient | Amount | Mixing |
|---|---|---|
| Flour | 100 lbs. | Creamed until smooth, 5 minutes. |
| Shortening (including 3% polyglycerides of Example 1) | 55 lbs. | |
| Granulated sugar | 110 lbs. | Added to above and mixed for several minutes. |
| Salt | 3¾ lbs. | |
| Baking powder | 5 lbs. | |
| Egg whites | 75 lbs. | Added in 1 min. and then creamed additional 2 minutes. |
| Milk | 100 lbs. | Add slowly, scraping bowl. Mix smooth. Time of mixing 5 min. at this stage. |
| Granulated sugar | 30 lbs. | |
| Flavor | To taste | |

The batter produced by the above formula, when baked, produced a white cake of larger volume, more tender in texture, and of longer keeping qualities than a cake prepared by the usual method employing ordinary amounts of liquids and sugar without the addition of polyglyceride esters with free hydroxy groups. While good results attend the use of the particular method given and the order of adding and mixing the different ingredients, I am not limited to the exact process given, as any method of incorporating the ingredients which will produce a homogeneous batter can be used. I have previously stated that instead of adding the polyglyceride substances to the shortening, they may be added to substantially any of the materials going to make up the cake. One very satisfactory method is to incorporate the polyglycerides in the egg material as already pointed out hereinabove.

I do not limit my invention to the use of a single higher molecular weight fatty acid ester of a single polyglycerol, nor to any particular character of fatty acid, nor to any particular single fatty acid ester of a mixture of polyglycerols. As shown clearly hereinabove, I may use either a single substance, a single higher fatty acid ester of a mixture of polyglycerols, or a mixture of higher fatty acid esters of a mixture of polyglycerols wherein the fatty acids are derived from natural oils, fats and waxes. I have found that a mixture of higher fatty acid ester of polyglycerols in some respects have better results in producing products of greater plasticity, and better dispersibility. All of my polyglycerols have free hydroxy groups as shown in the examples, and are characterized by their ability to reduce spattering in margarine during frying. In my United States Patent No. 1,917,257, which was co-pending with my original application Serial No. 431,964, filed Feb. 27, 1930, I disclosed the use of polyglycerides which function as interface modifiers in oleaginous-aqueous emulsions generally. My present application is directed to the use of the same types of substances in a cake batter type of emulsion which contains oleaginous and aqueous ingredients, as well as relatively large amounts of farinaceous material with larger proportions of sugar, whereby additional problems are involved and new results obtained.

What I claim as new and desire to protect by Letters Patent of the United States is:

1. A cake batter emulsion having included therein a proportion of a higher fatty acid ester of a polyglycerol with at least two free hydroxy groups, and a proportion of a higher fatty acid ester of glycerine with at least two free alcoholic hydroxy groups, the proportion of the polyglycerol ester being greatly in excess of the proportion of glycerine ester.

2. A cake having included therein a proportion of a higher fatty acid ester of a polyglycerol with at least two free hydroxy groups, and a proportion of a higher fatty acid ester of glycerine with at least two free alcoholic hydroxy groups, the proportion of the polyglycerol ester being greatly in excess of the proportion of glycerine ester.

3. A shortening composition having as constituents thereof a proportion of a higher fatty acid ester of a polyglycerol with at least two free hydroxy groups, and a proportion of a higher fatty acid ester of glycerine with at least two free alcoholic hydroxy groups, the proportion of the polyglycerol ester being greatly in excess of the proportion of glycerine ester.

4. The method of producing an improved cake batter which comprises dispersing in an ingredient of the cake batter a proportion of a higher fatty acid ester of a polyglycerol with at least two free hydroxy groups, and a proportion of a higher fatty acid ester of glycerine with at least one free alcoholic hydroxy group, the proportion of the polyglycerol ester being greater than the proportion of the glycerine ester, and mixing said ingredient with other ingredients of the cake to form a batter.

BENJAMIN R. HARRIS.